(12) United States Patent
Crickmore

(10) Patent No.: US 12,553,750 B2
(45) Date of Patent: Feb. 17, 2026

(54) FIBRE OPTIC SENSING

(71) Applicant: Optasense Holdings Limited, Surrey (GB)

(72) Inventor: Roger Crickmore, Farnborough (GB)

(73) Assignee: Optasense Holdings Limited, Surrey (GB)

( * ) Notice: Subject to any disclaimer, the term of this patent is extended or adjusted under 35 U.S.C. 154(b) by 240 days.

(21) Appl. No.: 18/558,250

(22) PCT Filed: Apr. 28, 2022

(86) PCT No.: PCT/GB2022/051075
§ 371 (c)(1),
(2) Date: Oct. 31, 2023

(87) PCT Pub. No.: WO2022/238677
PCT Pub. Date: Nov. 17, 2022

(65) Prior Publication Data
US 2024/0192033 A1 Jun. 13, 2024

(30) Foreign Application Priority Data
May 11, 2021 (GB) ..................................... 2106663

(51) Int. Cl.
*G01D 5/353* (2006.01)
*G01H 9/00* (2006.01)
*G01K 11/32* (2021.01)

(52) U.S. Cl.
CPC ......... *G01D 5/35361* (2013.01); *G01H 9/004* (2013.01); *G01K 11/32* (2013.01)

(58) Field of Classification Search
CPC ..... G01D 5/35361; G01H 9/004; G01K 11/32
See application file for complete search history.

(56) References Cited

U.S. PATENT DOCUMENTS

2017/0074688 A1\* 3/2017 Crickmore .......... G01K 11/3206
2018/0094952 A1\* 4/2018 Handerek .............. G01H 9/004
(Continued)

FOREIGN PATENT DOCUMENTS

CN 108519147 9/2018
CN 109210385 1/2019
(Continued)

OTHER PUBLICATIONS

Intellectual Property Office, Search Report mailed on Nov. 12, 2021, issued in connection with United Kingdom Patent Application No. GB2106663.4, 3 pages.
(Continued)

*Primary Examiner* — Dominic J Bologna
(74) *Attorney, Agent, or Firm* — McDonnell Boehnen Hulbert & Berghoff LLP

(57) ABSTRACT

This application relates to methods and apparatus for distributed fibre optic sensing. A sensing apparatus includes an optical arrangement which repeatedly interrogates a sensing optical fibre by launching coherent interrogating optical radiation into the sensing optical fibre. A detector detects Rayleigh backscatter from within the sensing fibre and a processor processes the detected backscatter to determine a measurement signal for each of a plurality of channels of the sensing optical fibre. The wavelength of the coherent interrogating optical radiation is modulated so as to vary between successive interrogations according to a modulation characteristic. The processor is operable to identify, for a given channel, an induced signal component corresponding to the modulation characteristic and determine an amplitude of the induced signal component so as to determine a compensation to be applied to the measurement signal for that channel to compensate for any variation in effective gauge length.

20 Claims, 2 Drawing Sheets

(56) References Cited

U.S. PATENT DOCUMENTS

2018/0259385 A1* 9/2018 Cedilnik .............. G01H 9/004
2019/0227184 A1* 7/2019 Cuny .............. G01D 5/35361

FOREIGN PATENT DOCUMENTS

CN    109210385 A  *  1/2019   .............. F17D 5/06
CN    110319917       10/2019
WO    2015/170117     11/2015

OTHER PUBLICATIONS

International Searching Authority, International Search Report and Written Opinion mailed on Jul. 15, 2022, issued in connection with International Patent Application No. PCT/GB2022/051075, filed Apr. 28, 2022, 13 pages.

* cited by examiner

FIBRE OPTIC SENSING

CROSS-REFERENCE TO RELATED APPLICATIONS

The present application is a national stage entry of PCT/GB2022/051075 filed Apr. 28, 2022, which claims priority to GB 2106663.4 filed on May 11, 2021, the contents of each of which are hereby incorporated by reference.

FIELD OF THE DISCLOSURE

This application relates to methods and apparatus for fibre optic sensing.

BACKGROUND

Distributed fibre optic sensing is a known type of sensing where an optical fibre is deployed as a sensing fibre and interrogated with electromagnetic radiation to provide sensing of environmental stimuli affecting the sensing fibre along its length. By analysing the radiation backscattered from within the sensing fibre, based on the round-trip travel time to different distances into the sensing fibre, the sensing fibre can effectively be divided into a plurality of discrete sensing portions which may be (but do not have to be) contiguous.

One class of distributed fibre optic sensing is based on interrogating the sensing fibre with coherent optical radiation and detecting any of the interrogating radiation which has been Rayleigh backscattered from within the sensing fibre.

The sensing fibre may be repeatedly interrogated, and each interrogation may comprise launching coherent interrogating radiation into a first end of the sensing fibre and detecting the Rayleigh backscatter from that interrogation, i.e. radiation which has been elastically backscattered at the same frequency as the interrogating radiation. As the interrogating radiation propagates in the sensing fibre, it may be backscattered from various scattering sites within the optical fibre, which may be inherent scattering sites that are inherently present in the optical fibre, i.e. not deliberately introduced reflection sites. The backscatter arriving back at the first end of the sensing fibre at any time will include contributions of backscatter from various different scattering sites from a portion of fibre illuminated by the interrogating radiation. As the interrogating radiation is coherent, the backscatter from the different scattering sites will interfere to provide an overall interference signal, which depends on the distribution of the scattering sites within the fibre.

Within each discrete sensing portion of the sensing fibre, disturbances of the fibre that cause a variation in effective optical path length of that section, for instance dynamic strains due to incident acoustic waves, results in a variation in the distribution of the scattering sites and hence a variation in the properties of the interference signal. This variation can be detected and analysed and used to give an indication of disturbance of the fibre at that sensing portion. Such a fibre optic sensor effectively acts as a linear sensing array of sensing portions of optical fibre which are responsive to dynamic disturbances such as strains due to acoustic stimuli, and thus such sensing is often referred to as distributed acoustic sensing (DAS), although the same principles can be applied to detect any stimulus that results in a variation in effective optical path length of the sensing fibre, such as dynamic temperature variations.

In some coherent Rayleigh based distributed fibre optic sensors the backscatter is processed to determine a phase value from the backscatter, for instance a demodulated value of phase of a carrier signal. In some examples the carrier signal may be generated by transmitting optical radiation at two different optical frequencies into the fibre, with a frequency difference that defines the carrier frequency, e.g. each interrogation may comprise two optical pulses at different frequencies to one another. In other examples the carrier signal could be generated by mixing backscatter at one optical frequency with a local oscillator at a different frequency. In any case, the relevant carrier signal component of the backscatter may be demodulated at the carrier frequency to provide an indication of phase for the carrier. The phase of the carrier signal for a given sensing portion varies with the optical path length and thus the phase value can be used to provide quantitative data about the stimulus affecting the sensing fibre. Typically a measurement signal is generated for each of a plurality of sensing portions or channels of the distributed fibre optic sensor, where the length of each sensing portion, referred to as the gauge length, is determined by the pulses that are transmitted into the fibre and/or by processing of the backscatter. In the case where each interrogation comprises two pulses, separated in time, which are transmitted into the fibre such that the backscatter from the two pulses mixes to produce a carrier signal, then at a particular time light from the first pulse will be received that has been reflected from a particular section of the fibre, while light received from the second pulse will have been reflected from a second, slightly nearer section, of the fibre. The gauge length is then defined by the separation between the midpoints of the sections from which the first and second pulses were reflected.

Such coherent Rayleigh phase based distributed fibre optical sensors can be usefully used to provide quantitative data regarding stimuli such as dynamic strains, e.g. from incident acoustic waves or the like, or dynamic temperature changes.

One issue that can affect such sensors is low frequency drift, due to changes in operating conditions over time. For many applications, such low frequency drift is not an issue as the signals of interest are signals at higher frequencies and the low frequency drift may be removed by filtering. However, in some applications the signals of interest may be relatively low frequency signals such as low frequency strains or temperature changes, and for such applications, drift may have a detrimental impact on accuracy.

SUMMARY

Embodiments of the present disclosure relate to methods and apparatus for fibre optic distributed acoustic sensing that at least mitigate at least some of the above-mentioned issues.

Thus, according to an aspect of the disclosure, there is provided a distributed fibre optic sensing apparatus, comprising: an optical arrangement configured to repeatedly interrogate a sensing optical fibre, wherein each interrogation comprises launching coherent interrogating optical radiation into said sensing optical fibre; and a detector configured to detect a backscatter signal comprising optical radiation which is Rayleigh backscattered from within the sensing fibre in response to an interrogation. A processor is configured to process the detected backscatter signal to determine, for each of a plurality of channels of the sensing optical fibre, a measurement signal indicative of a phase modulation of the detected backscatter signal. The apparatus is operable to controllably modulate a wavelength of the coherent interrogating optical radiation to vary between successive interrogations according to a modulation characteristic. The processor is configured, for at least one channel, to: identify an induced signal component corresponding to said modulation characteristic, determine an amplitude of the induced signal component; and determine a compensation to be applied to the measurement signal for that channel based on the amplitude of the induced signal component to compensate for any variation in effective gauge length.

In some examples, the processor may be configured to, for said at least one channel, determine a value of effective gauge length based on the amplitude of the induced signal component.

The modulation characteristic may comprise a modulation frequency. The modulation frequency may, for example, be within the range of 5-50 Hz inclusive. The apparatus may be configured to filter the measurement signals from the channels to remove the induced signal component at the modulation frequency after determining the amplitude of the induced signal component.

In some examples, the apparatus may be configured such that said phase modulation of the detected backscatter signal is a phase modulation of a carrier signal at a defined carrier frequency. The optical arrangement may be configured such that each interrogation comprises two optical pulses having different optical frequencies to one another and the frequency difference between the two optical pulses defines the carrier signal at the carrier frequency. The optical arrangement may alternatively be configured such that each interrogation comprises an optical pulse at a first launch frequency and is also configured to generate a local oscillator signal and to mix the local oscillator with said optical radiation which is Rayleigh backscattered from within sensing fibre to provide said backscatter signal, wherein the frequency of the local oscillator has a frequency difference from the first launch frequency which defines the carrier signal at the carrier frequency.

The apparatus may be configured to be operable such that the modulation of the wavelength of the coherent interrogating optical radiation is applied continuously, in use, to allow for continuous compensation for any variation in effective gauge length. The apparatus may be configured to be operable such that the modulation of the wavelength of the coherent interrogating optical radiation is applied periodically, in use, to allow for periodic compensation for any variation in effective gauge length.

The distributed fibre optic sensing apparatus may further comprise said sensing optical fibre.

In a further aspect there is provided a method of distributed fibre optic sensing comprising: repeatedly interrogating a sensing optical fibre, wherein each interrogation comprises launching coherent interrogating optical radiation into said sensing optical fibre and detecting a backscatter signal comprising optical radiation which is Rayleigh backscattered from within the sensing fibre in response to an interrogation. The method comprises processing the detected backscatter signal to determine, for each of a plurality of channels of the sensing optical fibre, a measurement signal indicative of a phase modulation of the detected backscatter signal. The method further comprises modulating a wavelength of the coherent interrogating optical radiation to vary between successive interrogations according to a modulation characteristic and the processing comprises, for at least one channel: identifying an induced signal component corresponding to said modulation characteristic, determining an amplitude of the induced signal component; and determining a compensation to be applied to the measurement signal for that channel based on the amplitude of the induced signal component to compensate for any variation in effective gauge length.

The method may be implemented in any of the ways described with reference to the apparatus of the first aspect.

Note that unless expressly indicated to the contrary or clearly incompatible, any feature of any of the embodiments described herein may be used in combination with any one or more features of any of the other described embodiments.

BRIEF DESCRIPTION OF THE DRAWINGS

Embodiments, and feature of embodiments of the present disclosure, will now be described by way of example only with respect to the accompanying drawings, of which.

DETAILED DESCRIPTION

Embodiments of the present disclosure relate to methods and apparatus for distributed fibre optic sensing, and in particular to coherent Rayleigh backscatter based distributed fibre optic sensing, such as distributed acoustic sensing (DAS). In particular, embodiments relate to methods and apparatus that can determine and/or compensate for variations in effective gauge length for channels of the distributed fibre optic sensor.

As noted above, coherent Rayleigh based distributed fibre optic sensing is a known technique for sensing for dynamic disturbances acting on a sensing fibre. Coherent Rayleigh based distributed fibre optic sensing can usefully be used in a variety of different applications.

Figure 1:
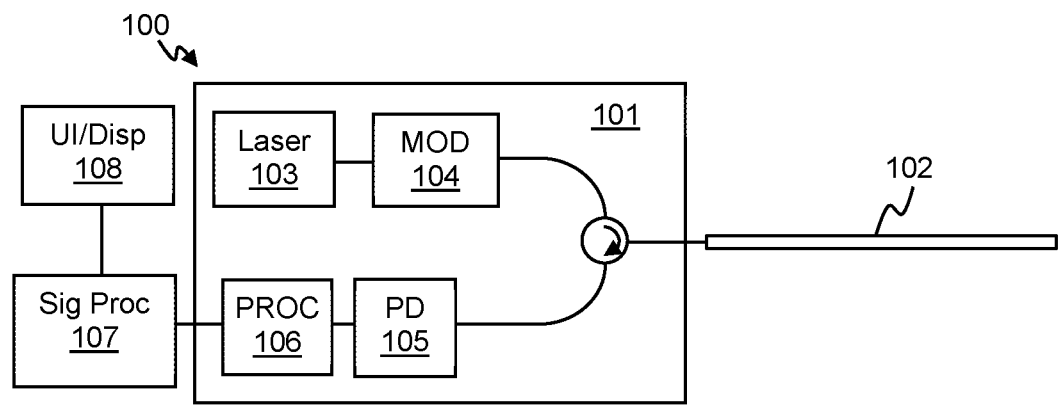
FIG. 1 illustrates an example of a distributed fibre optic sensor.

FIG. 1 shows a schematic of one example of a coherent Rayleigh distributed fibre optic sensing arrangement 100. An interrogator 101 is, in use, optically coupled to an optical fibre 102 which is to be used for sensing. The optical fibre 102, may be referred to herein as the sensing optical fibre or just sensing fibre (or sometimes as the fibre under test).

The sensing fibre 102 can be many kilometres in length and can, in some applications be tens of kilometres in length, say up to 40 km or more. For coherent Rayleigh distributed fibre optic sensing, the sensing fibre 102 may be a standard, unmodified single mode optic fibre such as is routinely used in telecommunications applications, although multimode fibre may be used in some applications (typically with reduced performance). The sensing fibre need not include any deliberately introduced reflection sites such a fibre Bragg grating or the like, but in some implementations some such reflection sites could be present, or the fibre may be one which has been fabricated or processed to provide greater scattering than a conventional telecommunications optical fibre.

The sensing fibre 102 may be deployed in an area of interest to be monitored and, in some cases, may be specifically deployed to allow for sensing. Depending on the particular use case, the sensing fibre may be deployed in a relatively permanent manner, e.g. being buried or otherwise secured in place. The interrogator 101 may be removably coupled to the sensing optical fibre 102, and thus in some instances, if continuous monitoring is not required, the interrogator 101 may be removed from the sensing fibre 102 when sensing is not required, possibly leaving the sensing fibre in situ. In some instances, use may be made of an existing optical fibre which is already deployed in the region of interest and which may have been originally deployed for some other performance, e.g. for communications. Note whilst the sensing fibre may be one continuous optical fibre, the sensing fibre could, in some applications, be formed from various optical fibre sections that have been spliced together or otherwise optically connected.

In use, the interrogator 101 repeatedly interrogates the sensing optical fibre 102 with coherent optical radiation and analyses the backscatter therefrom. The interrogator 101 thus comprises an optical source, in this example a laser 103, for generating coherent optical radiation and a modulator 104 for modulating the output of the laser. The modulator 104 modulates the output of the laser 103 so as to repeatedly interrogate the sensing fibre with optical radiation, which will be referred to herein as interrogating radiation, in a series of interrogations.

Note that as used herein the term "optical" is not restricted to the visible spectrum and, as used herein, the term optical refers to any electromagnetic radiation which may be guided by, and scattered from within, an optical fibre. For the avoidance of doubt, optical radiation as used herein includes infrared radiation and ultraviolet radiation. Any reference to "light" should also be construed accordingly.

The interrogating radiation may take different forms. In some examples, a single pulse of optical radiation at a given launch frequency may be used for each interrogation, although in some embodiments each interrogation may comprise two (or more) pulses, in which case the optical pulses may have different launch frequencies from one another, e.g. a frequency pattern as described in GB2,442,745 or as described in WO2020/016556, or optical characteristics such as described in WO2012/137022, the contents of each of which are hereby incorporated by reference thereto.

The modulator 104 thus modulates the optical radiation generated by laser 103 to provide suitable interrogating radiation. It will be understood that a single modulator 104 is illustrated in FIG. 1 for clarity, but in practice the modulator functionality could be implemented by multiple modulator components, e.g. there may be one or more modulator components to provide a desired frequency modulation and/or one or more modulator components to provide some amplitude modulation, such as to form distinct optical pulses.

The phenomenon of Rayleigh backscattering results in some fraction of the interrogating radiation input into the sensing fibre being reflected back to the interrogator, where it is detected to provide an output signal which can be representative of environmental disturbances acting on the fibre. The interrogator 101 therefore comprises at least one photodetector 105 arranged to detect radiation which is Rayleigh backscattered from within the sensing fibre 102. In some embodiments the backscatter may be mixed with a local oscillator signal prior to detection (not illustrated in FIG. 1).

The signal from the photodetector may be processed by processor 106 of the interrogator 101 to provide a measurement signal which is representative of disturbances acting on the sensing portions or channels of the fibre.

For a coherent Rayleigh distributed fibre optic sensor, the backscatter from the sensing optical fibre 102 will depend, at least partly, on the distribution of inherent scattering sites within the optical fibre, which will vary effectively randomly along the length of the fibre. Thus the backscatter characteristics, e.g. intensity, from any given interrogation will exhibit a random variation from one sensing portion to the next but, in the absence of any environmental stimulus, the backscatter characteristics from any given sensing portion should remain the same for each repeated interrogation (provided the characteristics of the interrogating radiation, such as the optical frequency, amplitude and duration of the pulse or pulses, remains the same for each interrogation). However, an environmental stimulus acting on the relevant sensing portion of the fibre can result in an optical path length change for that section of fibre, e.g. through stretching/compression of the relevant section of fibre and/or a refractive index modulation. As the backscatter from the various scattering sites within the sensing portion of fibre will interfere to produce the resulting intensity, a change in optical path length will vary the degree of interference. The variation in distribution of the scattering sites will result in a variation in intensity of backscattered from an affected sensing portion, which can be detected and used as an indication of a disturbance acting on the fibre, such as an incident acoustic wave.

For a phase based coherent Rayleigh distributed fibre optic sensor the processing by processor will generally determine a phase value from the backscattered light, e.g. the phase of a signal component at a defined carrier frequency. A signal component at a defined carrier frequency can be generated in various ways. For instance, as discussed above, each interrogation may comprise two optical pulses at different optical frequencies to one another, where the frequency difference between the pulses defines the carrier frequency. In such a case, backscatter from both pulses may interfere to provide a signal component at the carrier frequency. Alternatively, backscatter from a pulse at a given optical frequency may be mixed with a local oscillator signal (not illustrated in FIG. 1), where the optical frequency of the local oscillator differs from that of the backscatter by the defined carrier frequency.

The processor 106 may thus demodulate the signal from the photodetector 105 at the relevant carrier frequency to provide a value of phase for the carrier signal, as would be understood by one skilled in the art, for instance as described in any of GB2,442,745, WO2012/137021, WO2012/137022 or WO2020/016556, depending on the form of the interrogating radiation.

Any disturbance acting on the sensing fibre that results in a change in the optical path length of that part of the sensing fibre will result in a modulation to the phase of the carrier signal over that sensing portion, where the extent of the change in phase is proportional to the change in path length. Thus a stimulus acting on the sensing fibre can be detected by determining the extent of any phase modulation between repeated interrogations of the sensing fibre, and the magnitude of the phase modulation provides an indication of magnitude of the stimulus acting on the sensing fibre.

Generally the backscatter is processed to determine the extent of any phase modulation between successive interrogations for each of a plurality of channels of the sensing fibre, where the channels correspond to different sensing portions. The length of the individual channels or sensing portions, which is referred to as the gauge length, may be defined by the processing applied, for instance by processing the backscatter based on time of arrival.

The form of the optical input and the method of detection and processing allows the sensing fibre, which may be a single continuous optical fibre, to be spatially resolved into discrete longitudinal channel or sensing portions with a desired gauge length. That is, a measurement signal indicative of disturbance at one sensing portion, e.g. indicative of an incident acoustic wave, can be provided substantially independently of a measurement signal for another sensing portion. Note that the term acoustic, as used herein, shall be taken to mean any type of pressure wave or mechanical disturbance or varying strain generated on the optical fibre and will, for instance, include seismic waves or the like. The term acoustic is intended to refer to the type of stimulus acting on the sensing fibre but is not used to imply any particular frequency limitation.

Such a sensor may be seen as a fully distributed or intrinsic sensor, as it uses the intrinsic scattering process inherent in an optical fibre and thus distributes the sensing function throughout the whole of the optical fibre.

The measurement signals from interrogator 101 may, in some implementations, be passed to a signal processor 107, which may be co-located with the interrogator 101 or may be remote therefrom. Optionally there may also be a user interface/graphical display 108, which may be co-located with the signal processor or may be remote therefrom. The signal processor 107 and user interface/graphical display 108 may be realised by an appropriately specified computing device such as a PC. The signal processor 107 may be configured to process the measurement signals to provide some sensing or monitoring functionality depending on the application that the sensor is being used for.

Whilst, in general, the processor 106 of the interrogator unit may be operable to generate measurement signals from the sensing portions of the sensing fibre and the signal processor 107 may be operable to apply any application specific processing to the measurement signals, in at least some implementations at least some of the processing to generate the measurement signals could be performed by signal processor 107 or at least some processing of the measurement signals could be performed by processor 106.

Such coherent Rayleigh distributed fibre optic sensors, e.g. DAS sensors, can be usefully employed in a range of applications to provide information about environmental disturbances acting on the sensing fibre for each of a plurality sensing portions and, by determining an indication of phase, can provide quantitative data about the magnitude of the stimulus.

One issue with such sensors is that it is found that even if a constant external stimulus is applied to a section of the sensing fibre, the signal obtained from that part of the fibre will vary over time as the temperature or strain on the fibre varies, which is due to the distribution of the scattering sites within the fibre being modulated. If a long section of the sensing fibre is exposed to the same stimulus, then increasing the gauge length of the interrogation will increase the measurement signal, as the stimulus is being sensed over a greater length of fibre. Therefore, the changing signal level with a constant stimulus can be considered to be caused by a variation in the gauge length of the measurement, so at a particular time each sensing portion or region appears to have an effective gauge length which may differ from the expected nominal gauge length.

As the strain and temperature on the sensing fibre varies, the effective gauge length of a channel or sensing portion may thus vary. Thus, in operation, whilst measurement signals are generated for sensing portions of channels of a nominal gauge length, the actual effective gauge length may vary from this nominal value in an unknown way which leads to errors in the measurement.

If the sensing fibre is experiencing an acoustic stimulus over a length of fibre greater than the gauge length, then the measured signal obtained will be proportional to the level of the acoustic signal multiplied by the effective gauge length. As the effective gauge length is unknown the level of the acoustic signal has to be calculated from the measured signal assuming the gauge length is the nominal value, but if the effective gauge length differs from this then the deduced level of the acoustic signal will be incorrect. Furthermore, the level of a constant acoustic signal will appear to vary over time as the effective gauge length changes.

Similar issues occur when attempting to measure slower variations on a sensing fibre. For example, consider that it is wished to monitor temperature changes affecting a sensing fibre and that for, a length of the sensing fibre corresponding to several sensing portions, there is a uniform temperature, i.e. the sensing portions are at the same temperature as one another, but the temperature of that length of fibre varies over time. The signal obtained from each sensing section of the fibre as the temperature varies by a given amount is proportional to this temperature change multiplied by the effective gauge length of the fibre and may be different for each sensing section due to gauge length variation. However, as the effective gauge length is again unknown, each section would be assumed to have the nominal gauge length and so each section would appear to change in temperature by a different amount. As the temperature continues to change, this would result is the measured temperature variations of the various sensor sections drifting apart, even though they all remained at the same temperature.

Embodiments of the present disclosure thus relate to methods and apparatus or distributed fibre optic sensing that can identify and/or compensate for variations in effective gauge length.

To allow determination of the effective gauge length of one or more channels of the distributed fibre optic sensor, embodiments of the present disclosure modulate the wavelength of the interrogating radiation between successive interrogations of the sensing fibre in accordance with a predetermined modulation characteristic, for instance at a characteristic modulation frequency.

Varying the wavelength of the interrogating radiation from one interrogation to the next will result in a variation in the determined phase for a given channel or sensing portion from one interrogation to the next, even in the absence of any external disturbance. Thus, varying the wavelength of the interrogating radiation between successive interrogations of the sensing fibre will result in an apparent phase modulation between the interrogations which thus will appear as a signal component in the measurement signal from each channel. This induced signal component will vary in accordance with the modulation applied to the wavelength of the interrogating radiation, and if the wavelength is modulated with some modulation characteristic, for example at a defined modulation frequency, the signal component due to the wavelength modulation may be detected.

The amplitude of this induced signal component will depend on the extent of the wavelength modulation applied, but will also depend, for each channel or sensing portion, on the effective gauge length for that channel so the amplitude of the induced signal component will be proportional to the effective gauge length. Thus, for a given amplitude of wavelength modulation, it would be expected that each channel of the distributed fibre optic sensor would exhibit a corresponding induced signal component with a defined amplitude based on the nominal gauge length, but any variation in effective gauge length will result in a corresponding variation in the amplitude of the measurement signal. Thus, for any given channel or sensing portion the amplitude of the induced signal component in response to the wavelength modulation can be determined and provides an indication of the effective gauge length of that particular channel. This value indicative of the effective gauge length for a channel can then be used to apply a compensation to the measurement signals from that channel so as to compensate for any variation in effective gauge length.

Note that this analysis assumes that any external disturbance is effectively constant across the whole of the gauge length. In many applications, the deployment of the sensing fibre may be such that temperature variation is likely to be the main source of low frequency phase changes on the fibre. As the temperature change will probably be constant over an entire gauge length, the effective gauge length for temperature changes will be the same as that for wavelength changes of the laser. In large structures dynamic strains induced by movement of the structure may also produce constant strain over each sensing region so the effective gauge length when measuring these will also be the same as for the wavelength changes of the laser.

As noted above, to allow for the indicated signal component to be detected, the wavelength of the interrogating radiation may be modulated according to some detectable modulation characteristic. Conveniently, the wavelength may be modulated at a detectable modulation frequency. The modulation frequency may be selected so as not to interfere with the signals of interest and to provide a readily detectable signal component. In some examples the modulation frequency could of the order of a few Hertz or tens of Hertz, for instance in the range of 5-50 HZ, say at or around 10 Hz as an example. The amplitude of the wavelength modulation may be relatively small and may be selected so as to provide a readily detectable induced signal component.

For most DAS systems a signal of amplitude 1 radian is considered to be a very clear signal. The amount of wavelength modulation required to produce such a signal varies inversely with the gauge length but for a gauge length of 8 m a wavelength modulation of 2 MHz would be sufficient. In some embodiments therefore the extent of the wavelength modulation may be of the order of a few MHz.

Figure 2:
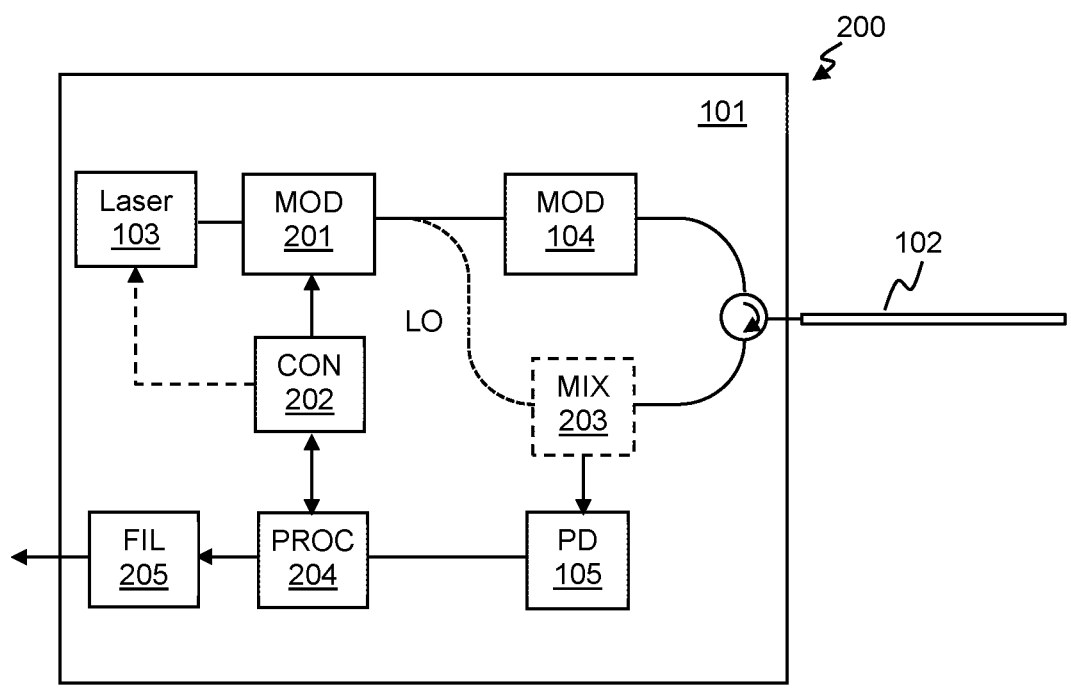
FIG. 2 illustrates an example of a distributed fibre optic sensor according to an embodiment.

FIG. 2 illustrates an example of a distributed fibre optic sensor system 200 according to an embodiment, in which similar components to those discussed with reference to FIG. 1 are identified by the same reference numerals. The distributed fibre optic sensor system 200 includes an interrogator unit 101 for, in use, interrogating a sensing optical fibre 102 as discussed above.

The interrogator 101 includes an optical source, which in this example is a laser 103, and an optical modulator 104 as described with respect to FIG. 1. The interrogator 101 of FIG. 2 also includes an optical modulator 201 for controllably apply a time-varying wavelength modulation to the interrogating radiation. The example of FIG. 2 illustrates that the modulator 201 is controlled by a controller 202 to modulate the optical radiation from the laser 103 according to a predetermined modulation characteristic, for example to apply a wavelength variation with a frequency of say 10 Hz or so, so as to vary the wavelength of the interrogating radiation launched into the sensing fibre 102 between successive interrogations.

In the example of FIG. 2, the time varying wavelength modulation is applied by modulator 201 upstream of the modulation by modulator 104 to form the interrogating radiation. Thus the modulator 104 may apply amplitude modulation, e.g. to form the relevant interrogating pulse(s) for each interrogation and may apply additional frequency shifts to the output of the modulator 201, e.g. to form pulses at different frequencies to one another. The form of the modulation applied by the modulator 104 may thus be the same for each interrogation, whereas the modulator 201 acts to vary the wavelength between successive interrogations.

It will, of course, be understood that in some embodiments the modulator 201 for applying the time varying wavelength modulation could be located downstream of the modulator 104 and/or at least some of the functionality of the modulators 104 and 201 could be combined and provided by the same components. However, in the case where a local oscillator signal LO is derived from the laser 103 to be mixed with the backscatter, e.g. by mixer 203, the local oscillator may advantageously by derived from the laser signal after the wavelength modulation has been applied, so that the frequency of the carrier signal does not vary with the applied wavelength modulation. It should also be noted that in some implementations at least some of the wavelength modulation may be applied by the controller 202 controlling operation of the laser 103.

The backscatter is detected by photodetector 105, possibly after mixing with the LO signal by mixer 203, and a processor 204 processes the detected backscatter signal to determine a measurement signal for each of a plurality of channels of the distributed fibre optic sensor, i.e. sensing portions of the sensing fibre, based on the extent of any phase modulation between repeated interrogations.

In embodiments of the present disclosure, however, the processor 204 is configured to determine and/or compensate for any variation in gauge length as discussed above.

Figure 3:
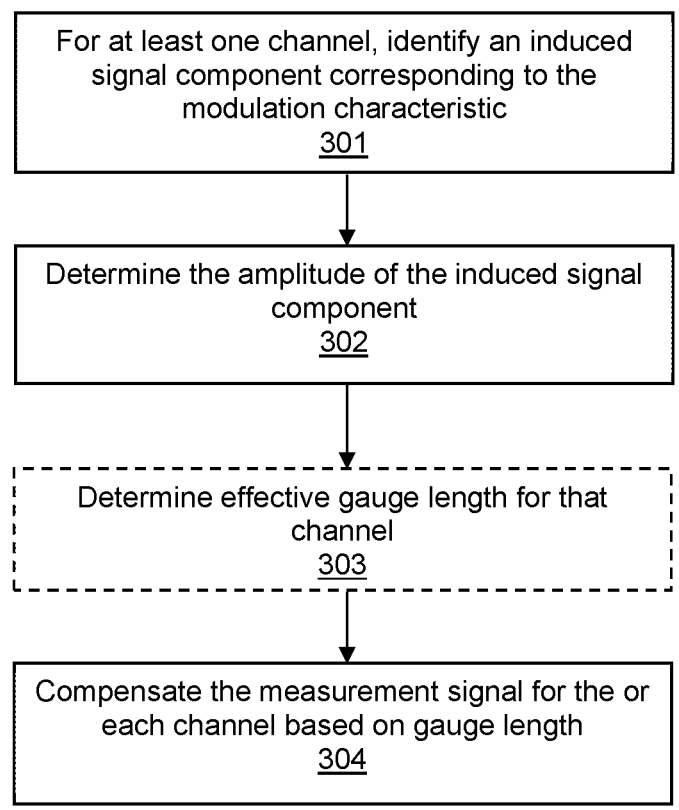
FIG. 3 illustrates a flow chart of a processing method according to an embodiment.

FIG. 3 illustrates one example of the processing that may be performed by the processor 204. For each channel, the processor may identify 301, in the measurement signal from that channel, an induced signal component corresponding to the modulation characteristic. Where wavelength modulation is applied at a characteristic modulation frequency this may involve identifying a signal component at the relevant modulation frequency.

The processor 204 may then determine 302 the amplitude of the induced signal component. In some cases, based on the determined amplitude, the effective gauge length for the relevant channel may be determined 303, although in some implementations the amplitude value may be used for compensation without specifically determining a value of effective gauge length.

In any case, based on the determined amplitude value or processed indication of gauge length, the processor may apply compensation to the measurement signals from that channel 304. The compensation effectively corrects the measurement signal for any variation in gauge length for the relevant channel from the nominal gauge length.

In this way the measurement signals from each channel may be individually compensated for any variation in gauge length for that channel, which removes a significant source of error and improves the accuracy of the measurement signals. The same procedure can be used for correcting for both high frequency (e.g. acoustic) and low frequency (e.g. temperature) signals.

Referring back to FIG. 2, the compensated measurement signals may then be output. In some cases the measurement signals may be filtered by a filter 205 to remove the induced signal component, e.g. with a notch filter based on the modulation frequency.

The controller 202 may be operable to apply the wavelength modulation in various modes. In some cases the controller 202 may operate so that the wavelength modulation is applied in a relatively continuous manner. This may allow the effective gauge length of each channel to be determined in a relatively continuous manner. In some cases however it may be sufficient to determine a suitable compensation in a periodic fashion, in which case the controller may control the wavelength modulation to be applied only periodically. The controller 202 may also be operable to disable the wavelength modulation in at least one mode of operation, e.g. for detecting signals of interest at higher frequency where the controlled wavelength modulation may interfere.

It will be noted that the discussion with respect to FIG. 2 contemplates that the processing to determine and/or compensate for any gauge length variations may be implemented by the processor 204 of the interrogator unit. In some cases however the processing to detect the induced signal component and to compensate for any gauge length variations could be performed by a processor external to the interrogator unit.

It will be noted, however, that some processing schemes for processing the returns from a distributed fibre optic sensor make use of diversity processing, where the backscatter is effectively oversampled and the subsample returns are effectively independently demodulated before being combined, possibly based on a quality metric, to provide an overall measurements signal for a given channel. In such a case each independent demodulated signal may correspond to a different gauge length, however since the laser modulation and measurement signals are always obtained from the same selection of subchannels they still experience the same effective gauge length and so the correction procedure can be applied to the diversity processed data.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A distributed fibre optic sensing apparatus, comprising:
an optical arrangement configured to repeatedly interrogate a sensing optical fibre, wherein each interrogation comprises launching coherent interrogating optical radiation into said sensing optical fibre;
a detector configured to detect a backscatter signal comprising optical radiation which is Rayleigh backscattered from within the sensing fibre in response to an interrogation; and
a processor configured to process the detected backscatter signal to determine, for each of a plurality of channels of the sensing optical fibre, a measurement signal indicative of a phase modulation of the detected backscatter signal;
wherein the apparatus is operable to controllably modulate a wavelength of the coherent interrogating optical radiation to vary between successive interrogations according to a modulation characteristic, and
wherein the processor is configured, for at least one channel, to:
identify an induced signal component corresponding to said modulation characteristic,
determine an amplitude of the induced signal component; and
determine a compensation to be applied to the measurement signal for that channel based on the amplitude of the induced signal component to compensate for any variation in effective gauge length.

2. The distributed fibre optic sensing apparatus of claim 1 wherein the processor is configured to, for said at least one channel, determine a value of effective gauge length based on the amplitude of the induced signal component.

3. The distributed fibre optic sensing apparatus of claim 1, wherein the modulation characteristic comprises a modulation frequency.

4. The distributed fibre optic sensing apparatus of claim 3 wherein the modulation frequency is within the range of 5-50 Hz inclusive.

5. The distributed fibre optic sensing apparatus of claim 3, wherein the apparatus is configured to filter the measurement signals from said channels to remove the induced signal component at the modulation frequency after determining the amplitude of the induced signal component.

6. The distributed fibre optic sensing apparatus of claim 1 wherein the apparatus is configured such that said phase modulation of the detected backscatter signal is a phase modulation of a carrier signal at a defined carrier frequency.

7. The distributed fibre optic sensing apparatus of claim 6, wherein the optical arrangement is configured such that each interrogation comprises two optical pulses having different optical frequencies to one another and the frequency difference between the two optical pulses defines the carrier signal at the carrier frequency.

8. The distributed fibre optic sensing apparatus of claim 6, wherein the optical arrangement is configured such that each interrogation comprises an optical pulse at a first launch frequency and is also configured to generate a local oscillator signal and to mix the local oscillator with said optical radiation which is Rayleigh backscattered from within sensing fibre to provide said backscatter signal, wherein the frequency of the local oscillator has a frequency difference from the first launch frequency which defines the carrier signal at the carrier frequency.

9. The distributed fibre optic sensing apparatus of claim 1 wherein the apparatus is configured to be operable such that the modulation of the wavelength of the coherent interrogating optical radiation is applied continuously, in use, to allow for continuous compensation for any variation in effective gauge length.

10. The distributed fibre optic sensing apparatus of claim 1 wherein the apparatus is configured to be operable such that the modulation of the wavelength of the coherent interrogating optical radiation is applied periodically, in use, to allow for periodic compensation for any variation in effective gauge length.

11. The distributed fibre optic sensing apparatus of claim 1 further comprising said sensing optical fibre.

12. The distributed fibre optic sensing apparatus of claim 1 wherein the modulation of the wavelength of the coherent interrogating optical radiation is applied continuously to allow for continuous compensation for any variation in effective gauge length.

13. A method of distributed fibre optic sensing comprising:
repeatedly interrogating a sensing optical fibre, wherein each interrogation comprises launching coherent interrogating optical radiation into said sensing optical fibre;
detecting a backscatter signal comprising optical radiation which is Rayleigh backscattered from within the sensing fibre in response to an interrogation; and
processing the detected backscatter signal to determine, for each of a plurality of channels of the sensing optical fibre, a measurement signal indicative of a phase modulation of the detected backscatter signal;

wherein the method further comprises modulating a wavelength of the coherent interrogating optical radiation to vary between successive interrogations according to a modulation characteristic, and said processing comprises, for at least one channel:

identifying an induced signal component corresponding to said modulation characteristic, determining an amplitude of the induced signal component; and determining a compensation to be applied to the measurement signal for that channel based on the amplitude of the induced signal component to compensate for any variation in effective gauge length.

14. The method of claim 13 wherein the processing comprises, for said at least one channel, determining a value of effective gauge length based on the amplitude of the induced signal component.

15. The method of claim 14 further comprising filtering the measurement signals from said channels to remove the induced signal component at the modulation frequency after determining the amplitude of the induced signal component.

16. The method of claim 13, wherein the modulation characteristic comprises a modulation frequency.

17. The method of claim 16 wherein the modulation frequency is within the range of 5-50 Hz inclusive.

18. The method of claim 13 wherein the phase modulation of the detected backscatter signal is a phase modulation of a carrier signal at a defined carrier frequency.

19. The method of claim 18 wherein each interrogation comprises two optical pulses having different optical frequencies to one another and the frequency difference between the two optical pulses defines the carrier signal at the carrier frequency.

20. The method of claim 18, wherein each interrogation comprises an optical pulse at a first launch frequency and the method comprises mixing optical radiation which is Rayleigh backscattered from within sensing fibre with a local oscillator signal to provide said backscatter signal, wherein the frequency of the local oscillator has a frequency difference from the first launch frequency which defines the carrier signal at the carrier frequency.

* * * * *